United States Patent
Böhm et al.

(10) Patent No.: US 6,802,401 B1
(45) Date of Patent: Oct. 12, 2004

(54) DEVICE AND METHOD FOR CONTROLLING AN ELECTRICALLY ACTUATED PARKING BRAKE

(75) Inventors: Jürgen Böhm, Oberneisen (DE); Joachim Nell, Hanau (DE)

(73) Assignee: Continental Teves AG & Co., oHG, Frankfurt (DE)

( * ) Notice: Subject to any disclaimer, the term of this patent is extended or adjusted under 35 U.S.C. 154(b) by 0 days.

(21) Appl. No.: 09/980,418
(22) PCT Filed: Jun. 1, 1999
(86) PCT No.: PCT/EP99/03792
§ 371 (c)(1), (2), (4) Date: Nov. 30, 2001
(87) PCT Pub. No.: WO00/73114
PCT Pub. Date: Dec. 7, 2000

(51) Int. Cl.⁷ .............................. B60T 7/10; B60T 13/74
(52) U.S. Cl. ........................ 188/158; 188/72.1; 303/20
(58) Field of Search ................................. 188/162, 161, 188/151 A, 158, 156, 72.1, 72.8, 2 D; 200/61.12; 303/122.03, 122.04, 20, 3, 115.2, 155, 191, 192, 193; 192/219.4, 222, 219.6; 701/70, 65, 66; 180/287; 477/182, 184; 318/370, 362, 266, 468

(56) References Cited

U.S. PATENT DOCUMENTS 6,139,117 A * 10/2000 Shirai et al. ................... 303/3

6,406,102 B1 * 6/2002 Arnold ......................... 303/20

FOREIGN PATENT DOCUMENTS

| DE | 41 29 919 | 2/1993 |
| DE | 42 05 588 | 8/1993 |
| DE | 42 18 717 | 12/1993 |
| DE | 195 48 560 | 6/1997 |
| DE | 197 44 356 | 1/1999 |
| WO | 90/15743 | 12/1990 |
| WO | 96/26091 | 8/1996 |

OTHER PUBLICATIONS

Search Report of the German Patent Office for Appln 19802044.9.

* cited by examiner

Primary Examiner—Douglas C. Butler
(74) Attorney, Agent, or Firm—Honigman Miller Schwartz and Cohn LLP

(57) ABSTRACT

The present invention relates to a device and a method for controlling an electrically actuated parking brake. Especially, a tip switch is provided which is movable to adopt a tensioning position, a release position, and a neutral position. For example, when the tip switch is moved by the driver to adopt the tensioning position, the control unit increases a nominal value of the actuating force of the parking brake. By actuating the tip switch, the driver is thus able to determine which actuating force is used to actuate the parking brake.

7 Claims, 3 Drawing Sheets

DEVICE AND METHOD FOR CONTROLLING AN ELECTRICALLY ACTUATED PARKING BRAKE

This application is a 371 of PCT/EP99/03792 filed Jun. 1, 1999.

TECHNICAL FIELD

The present invention generally relates to vehicle brake systems, and more particularly relates to a device and a method for controlling an electrically actuated parking brake.

BACKGROUND OF THE INVENTION

Parking brake systems are disclosed in the state of the art which are connected to a device that is activated by the physical strength of the driver by way of cables and linkage. The said muscular-power operated actuated device is typically a pedal activated by the driver's foot or a hand brake lever activated by the driver's hand.

Recently, parking brakes have become known wherein an electromotive brake actuation is provided. For example, DE 4129919 A1 describes that electric motors are arranged on the wheel brakes, respectively, and can be actuated by way of a corresponding signal so that the parking brake is activated.

However, the electrically actuated parking brake suffers from the disadvantage that the driver's request is not taken into account appropriately (e.g. upon an actuation or activation of the parking brake, a maximum tensioning force would always be adjusted, with the result of excessive stress acting on the brake system at an early time.) This, in turn, would necessitate a more sophisticated construction of the parking brake system to withstand these stresses, which sophistication inevitably increases the price for its manufacture.

An object of the present invention is to provide a device and a method for controlling an electrically actuated parking brake which detect a driver's request by way of an operating element and convert it into corresponding nominal values for the actuating force.

The present invention arranges for a device for actuation of an electrically actuated parking brake which may include input means for a driver's request relating to an actuation of the parking brake. Further, the device of the present invention can comprise a control unit for detecting the driver's request by way of a corresponding output signal of the input means. Still further, the control means can determine a nominal value FS_soll corresponding to the driver's request and issue a control signal to an actuator of the parking brake corresponding to the determined nominal value FS_soll.

The solution according to the present invention permits converting the driver's request directly into a corresponding nominal value FS_soll of the actuating force of the parking brake. The actuating force may roughly correspond to a tensioning force or a cable force. The actuator may be an electric motor which directly applies a brake shoe against a rotating part of the wheel brake. However, it is also possible that a Bowden cable is actuated by the electric motor or the actuator which will then actuate the wheel brake or the parking brake by way of corresponding deflection means.

The fact that a nominal value corresponding to the driver's request is produced permits realizing a system which basically corresponds to that of the conventional, muscular-power operated parking brake. Thus, the driver hardly needs to adapt to a different way of braking because he/she is in a position to indicate by way of the input means a respective actuating force in conformity with his/her request. When the driver parks the vehicle e.g. on a flat underground, he/she is able to actuate the electrically actuated parking brake only to a slight degree according to his/her request. When the driver parks the vehicle on a steep downgrade, e.g. on a slope with a gradient of 30%, he/she may now adjust the maximum actuating force. Hence, the parking brake is loaded with the maximum actuating force only when this is absolutely necessary. Of course, this prolongs the service life of the brake system. Further, the driver may also use the parking brake according to the present invention as a hill holder on gradients when he/she chooses the actuating force to be low.

According to the present invention, the input means can be actuated by the driver to adopt a tensioning position, a release position, and a neutral position. Additionally, the input means can be designed as a tip switch, and the tip switch is redundant. This allows further enhancing the safety of actuation, and it is possible to detect potential defects.

When the input means has adopted a neutral position according to the present invention, an actual value FS_ist of the parking brake can be maintained. Once the input means has adopted the release position, the nominal value FS_soll is set to zero. When, in addition, the input means has adopted the tensioning position, the nominal value FS_soll will be increased starting from the actual value FS_ist.

The nominal value FS_soll can be increased gradually in a tensioning position until a limit value FS_max. It is, of course, also possible to infinitely variably increase the nominal value FS_soll, if desired.

It shall be noted in this respect that the above-mentioned example of the design of the input means as tip switch is meant as an option only. It is also feasible to provide a slider switch which indicates the nominal value FS_soll. Still other input means may be used, however, attention should be paid that the input means permits a haptic feedback. When the input means is actuated, this provides the driver with a feedback about which condition the parking brake is in right now and which nominal value is indicated at that moment.

Further, it is possible to represent the actual value FS_ist and/or the nominal value FS_soll by an optical display device. Such an optical display device could be light-emitting diodes or similar means that indicate to the driver which actuating force of the parking brake prevails at the moment or which actuating force of the parking brake is or was just input as nominal value by way of the input means.

Further, the control unit can induce an actuating electronics of the parking brake to switch to an inactive condition with a minimum power absorption upon expiry of a predetermined duration $T_{rest}$ after the last actuation of the input means. It is thereby possible to achieve a delay in disconnecting which switches the actuating electronics or the control unit into an operating mode with a minimum power absorption. It shall be noted in this respect that a separate control unit for the electrically actuated parking brake can be realized. However, it is also possible to integrate the control unit or the actuating electronics for the parking brake into an existing control unit, for example, into the control unit for the ABS brake system.

BRIEF DESCRIPTION OF THE INVENTION

DETAILED DESCRIPTION OF THE PREFERRED EMBODIMENTS

Figure 1:
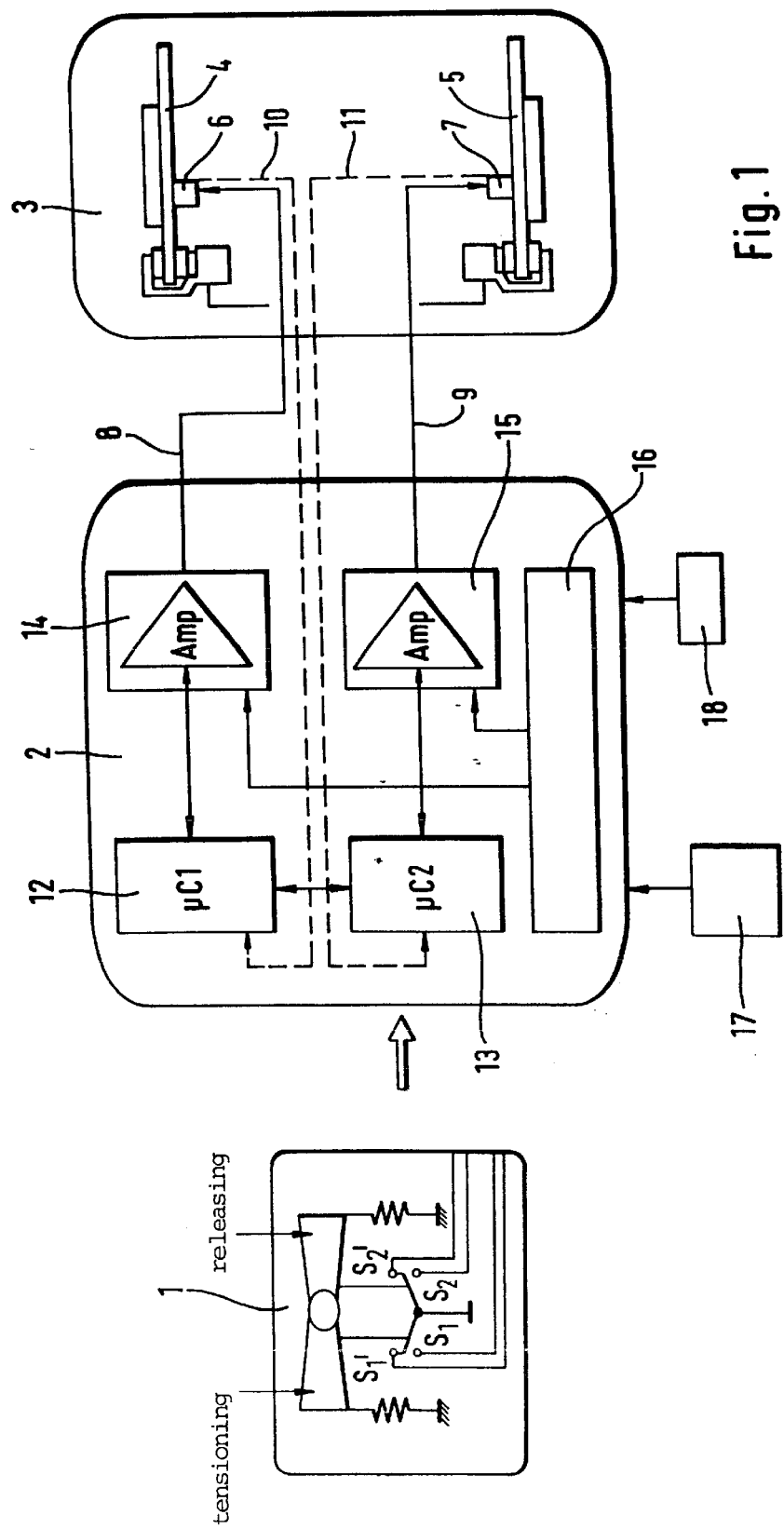
FIG. 1 is a schematic representation of a device according to the present invention.

The embodiment of FIG. 1 shows a tip switch 1 which, unless operated, remains in its neutral position. This neutral position is illustrated in FIG. 1. In case the tip switch 1 would be actuated on its left-hand side by a driver, the tip switch 1 would move into a tensioning position, and with an actuation of the tip switch 1 on its right-hand side, a release position would be provided.

The tip switch 1 is redundant and respectively designed as a change-over switch which represents an actuating element of digital operation. The neutral position illustrated in FIG. 1 corresponds to the switch position S1=0 (open), S1'=1 (closed), S2'=0 (open) and S2=1 (closed).

S1=1 and S2=0 applies in the tensioning position, and S1=0 and S2=1 applies in the release position. If S1=1 and S2=1 applies, this indicates an undefined state and, thus, a defect of the tip switch 1 or a control unit 2, and in this case the control unit 2 would cause no actuation of the parking brake 3 and, thus, no variation of the current actual value. Besides, an error report could be submitted to a diagnosis unit in this case, and a corresponding warning lamp could be activated.

The tip switch 1 is electrically connected to the control unit 2 so that the driver's request can be converted into corresponding actuating signals for an activation of the parking brake 3.

The parking brake 3 includes an electric motor 6 and 7, respectively, on at least two wheel brakes 4 and 5. The electric motor 6 can be actuated by way of an actuation line 8, and the electric motor 7 can be actuated by way of an actuation line 9. Corresponding commands can be output to the electric motors 6 and 7 by way of the actuation lines 8 and 9 so that the motors adjust the requested actuating force FS_soll. The electric motors 6 and 7 also include feedback lines 10 and 11 which transmit the actual position and/or the actual actuating force to one microcomputer 12, 13, respectively. The microcomputer 12, 13 is now in a position to ensure that the nominal value predetermined by way of the lines 8, 9 is achieved. The actuation of the electric motors 6 and 7 is effected by corresponding amplifiers 14 and 15.

In addition, there is provision of an emergency circuit 16 which energizes the amplifiers 14 and 15. The emergency circuit 16 can safeguard the current supply by means of an auxiliary battery 18 when a main battery 17 fails.

The entire system illustrated in FIG. 1 has a redundant design so that the reliability in operation is ensured even upon failure of an element or component.

Also, it shall be noted in this respect that a signal of a Controller-Area-Network (CAN) can still be superposed on the tip switch 1 or the input means in order to activate the parking brake, e.g. according to a hill-holder function, or to adjust the actuating force in conformity with a measured gradient.

Figure 2:
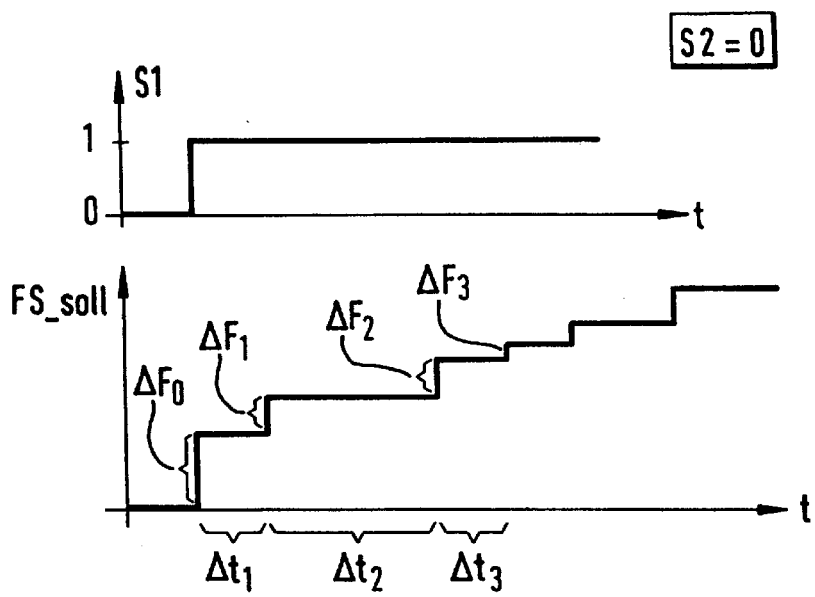
FIGS. 2 and 3 show a graph of a variation of the nominal value FS_soll plotted against time.

The position of the switch SI plotted against time t is shown in the top illustration in FIG. 2, and the nominal value FS_soll plotted against time t is shown in the bottom illustration. The same applies to FIG. 3.

Switch S2 is open, i.e., S2=0, applies to both Figures or illustrations.

It is illustrated in FIG. 2 that switch 1 is closed at a certain point of time, what corresponds to a digital 1. When the control unit 2 senses this signal, it increases the nominal value of the actuating force by an amount $\Delta F_0$. When the tip switch remains in the tensioning position, the nominal value FS_soll is increased by another amount $\Delta F_1$ upon expiry of a predetermined time period $\Delta t_1$. Upon expiry of another time period $\Delta t_2$, the nominal value FS_soll is increased by another amount $\Delta F_2$, etc. It shall be mentioned in this respect that the amounts of increase of the nominal value and the time periods of maintaining the increases are not equidistant. For example, it may be favorable that the initial amount $\Delta F_0$ is higher than the following amounts $\Delta F_1$, $\Delta F_2$, $\Delta F_3$, etc. This permits a rapid initial activation of the parking brake system, wherein it is avoided, however, that the maximum value prevails too early. The maximum value can be achieved only after a longer actuation of the tip switch 1.

Figure 3:
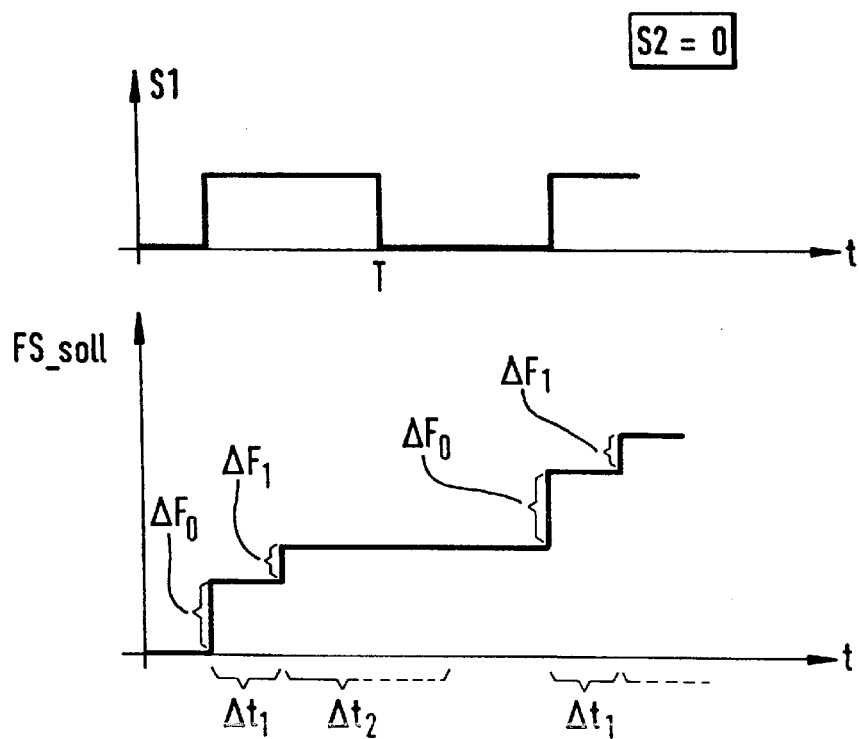

It is illustrated in FIG. 3 that the tip switch 1 is initially moved to adopt a tensioning position until a time T. Subsequently, the tip switch 1 will be no longer actuated and passes over into its neutral position. This implies that the nominal value FS_Soll is maintained constant. When the tip switch 1 is thereafter moved to adopt the tensioning position again, the nominal value FS_soll is increased by an amount $\Delta F_0$, namely starting from the actual value of the actuating force FS_ist.

It shall be noted that a continuous increase of the nominal value FS_soll is, of course, also possible. The same applies to an adjustment of identical force increments $\Delta F_{0,1,2} \ldots$ and time increments $\Delta t_{1,2,3} \ldots$.

Figure 4:
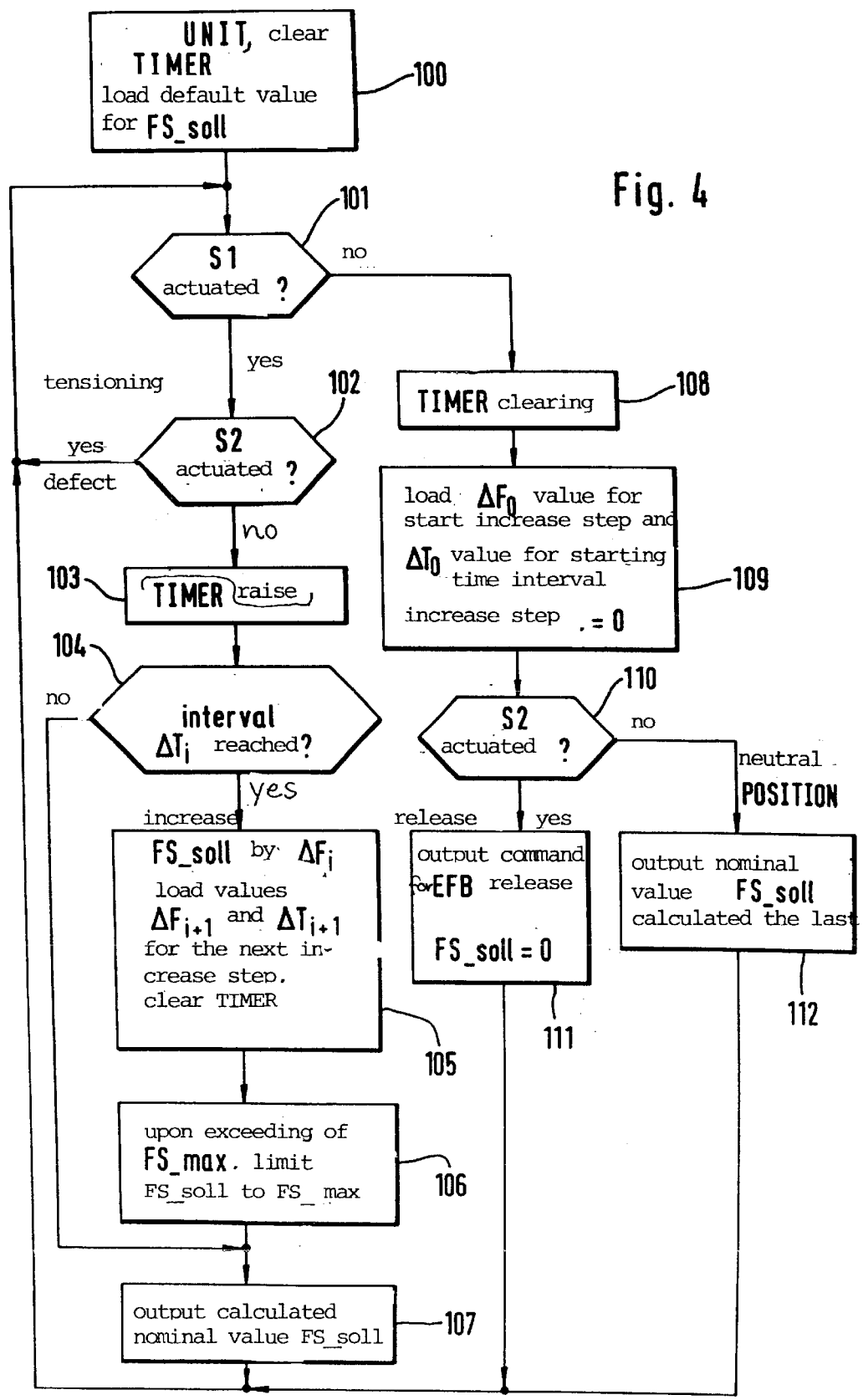
FIG. 4 is a flow chart showing an example of a processing operation in the control unit according to the present invention.

FIG. 4 shows a flow chart of a processing operation as it can be performed in the control unit 2 or in the microprocessors 12 and 13.

The processing operation is initialized and a timer is cleared in a step 100. Further, a default value for FS_soll is loaded. This default value can mean a predetermined actuation or movement of the brake shoes in the direction of the rotating part of the parking brake 3 in order to minimize the actuating travels of the parking brake. Polling is made in step 101 whether switch SI of the tip switch 1 is actuated (S1=1). If S1 is actuated, it is concluded that the tip switch 1 is in a tensioning position, whereupon a polling is made in step 102 whether switch S2 is additionally actuated (S2=1). If this is the case, a defect of the system or the tip switch 1 is assumed, and the processing operation moves back between the steps 100 and 101. This means that the parking brake 3 is not activated and/or its condition is not changed.

When it is judged in step 102 that switch S2 is not actuated, the timer is started in step 103. A polling is made in step 104 whether a predetermined time interval $\Delta T_i$ is reached. If this is the case, the nominal value FS_Soil is increased by $\Delta F_1$, and the values $\Delta F_{i+1}$ and $\Delta T_{i+1}$ are loaded for the next step of increase. The timer is reset. It is subsequently checked in a step 106 whether the nominal value FS_soll has reached a maximum value FS_max and, if yes, the nominal value FS_soll is limited to this maximum value FS_max. Thereafter, the calculated nominal value is output in a step 107, and the processing operation branches back between steps 100 and 101.

When it was judged in step 104 that the time interval $\Delta T_i$ is not reached, a branching between steps 106 and 107 occurs. This means that the nominal value is kept constant still because the predefined time interval $\Delta T_i$ has not yet expired.

When it is judged in step 101 that the switch S1 is not actuated, the timer is reset or cleared once again in a step 108. Then, the value $\Delta F_0$ for the start increase step and $\Delta T_0$ for the start time interval is loaded in a step 109 (increase step=0). It is then checked in a step 110 whether the switch S2 is actuated (S2=1). When the switch S2 is actuated, a release position of the tip switch 1 is concluded, and a command to release the electrically actuated parking brake is output in step 111, with the value FS_soll being set to zero. The processing operation will then have a branch back between steps 100 and 101.

When it is judged in step 110 that the switch 52 is not actuated (S2=0), it is concluded that the tip switch 1 has adopted its neutral position. The nominal value FS_soll calculated the last will then be output to the parking brake 3 in a step 112, i.e., the actual condition is maintained.

As is shown hereinabove, a neutral position is inferred from a non-actuation of the input means or the tip switch (S1=0, S2=0). Thus, the current actuating condition of the parking brake 3 is maintained, and the nominal value (FS_soil) defined as last for the electric parking brake 3 is maintained and/or adjusted by means of the corresponding control.

When the tip switch is moved to assume a release position (S1=0, S2=1), a command for release is output to the control (FS_soll=0) irrespective of the current actuating condition of the parking brake 3. Subsequently, the electric parking brake is released, and a lining clearance is adjusted (for minimizing the actuating travels). It is not necessary to keep the output means or the tip switch depressed in the release position during the entire release operation of the parking brake 3. Rather, it is sufficient to initiate the release of the parking brake 3 by a short actuation of the switch into the release position.

When the tip switch is moved to assume its tensioning position (S1=1, S2=0), the nominal value FS_soll which prevails before the commencement of the tip switch actuation will be increased gradually as long as the tip switch is actuated. When the switch is released again after a predetermined time T, i.e., the tip switch passes over into the neutral position, and is then actuated again, the procedure of the stepwise nominal value increase will be initialized and started again (until the maximum nominal value FS_max is reached or as long as the tip switch remains in its tensioning position).

What is claimed is:

1. Device for controlling an electrically actuated parking brake, comprising:
    a switch having first and second switching elements, wherein each switching element includes a respectively associated output line, wherein said switch includes a first tensioning position; a second, release position; and a third, neutral position, and wherein said switch places one valid signal on said respectively associated output lines for each of said positions,
    a control unit coupled to said switch for analyzing signals presented on said respectively associated output lines and for determining whether the switching elements have entered an undefined state, and wherein if said switching elements have not entered an undefined state, then said control unit determines a nominal value of a parking brake actuating force, and outputs a brake control signal, representative of the parking brake actuating force,
    brake actuator coupled to said brake control signal for actuating a parking brake, wherein said parking brake includes an electric motor.

2. Device as claimed in claim 1, wherein when the switch is in the neutral position the value of the brake control signal is maintained.

3. Device as claimed in claim 1, wherein when the switch is in the tensioning position, the value of the brake control signal increases in a uniform stair-step fashion.

4. Device as claimed in claim 1, wherein when the switch is in the tensioning position, the value of the brake control signal increases in a non-uniform stair-step fashion.

5. Device as claimed in claim 1, wherein the control unit includes means for inducing an actuating electronics of the parking brake to switch to an inactive condition with a minimum power absorption upon expiry of a predetermined duration.

6. Device as claimed in claim 1, wherein the actual value associated with a parameter of said parking brake is indicated by an optical display device.

7. Device as claimed in claim 1, wherein the switch provides a tactile feedback of the brake actuating condition.

* * * * *